(12) United States Patent
Almog et al.

(10) Patent No.: US 9,353,267 B2
(45) Date of Patent: May 31, 2016

(54) CHARGE DIRECTOR FOR LIQUID TONER

(75) Inventors: Yaacov Almog, Nes Ziona (IL); Avi Koller, Nes Ziona (IL); Elliad Silcoff, Nes Ziona (IL); Albert Teishev, Nes Ziona (IL); Yaffa Israeli, Nes Ziona (IL); Gary Larson, San Diego, CA (US); Lufei Lin, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 13/246,563

(22) Filed: Sep. 27, 2011

(65) Prior Publication Data

US 2012/0018683 A1 Jan. 26, 2012

Related U.S. Application Data

(63) Continuation of application No. 12/300,305, filed as application No. PCT/US2006/018297 on May 10, 2006, now abandoned.

(51) Int. Cl.
| | | |
|---|---|---|
| C08F 120/10 | (2006.01) | |
| A61L 15/60 | (2006.01) | |
| C09C 3/08 | (2006.01) | |
| B82Y 30/00 | (2011.01) | |
| C09C 1/02 | (2006.01) | |
| G03G 9/135 | (2006.01) | |

(52) U.S. Cl.
CPC . C09C 3/08 (2013.01); B82Y 30/00 (2013.01); C09C 1/02 (2013.01); C09C 1/025 (2013.01); C09C 1/027 (2013.01); G03G 9/135 (2013.01); G03G 9/1355 (2013.01); *C01P 2004/64* (2013.01); *C01P 2006/40* (2013.01)

(58) Field of Classification Search
USPC .......... 430/9, 137.1, 117.1, 18, 33, 124, 115, 430/137, 114; 424/9.1; 524/296, 430; 428/402–402.24, 403, 404, 407, 321.1, 428/474.4; 427/331, 389.9, 212, 427/213–213.36, 483, 256; 264/534, 5, 41, 264/4–4.7; 423/432, 266
See application file for complete search history.

(56) References Cited

U.S. PATENT DOCUMENTS

| | | | |
|---|---|---|---|
| 4,766,061 A | 8/1988 | Simons | |
| 4,780,389 A | 10/1988 | El-Sayed | |
| 4,990,416 A | 2/1991 | Mooney | |
| 5,047,306 A | 9/1991 | Almog | |
| 5,246,916 A | 9/1993 | Mooney et al. | |
| 5,300,390 A * | 4/1994 | Landa et al. | 430/115 |
| 5,306,755 A * | 4/1994 | Yau et al. | 524/296 |
| 5,558,855 A | 9/1996 | Quay | |
| 5,595,723 A | 1/1997 | Quay | |
| 5,679,724 A | 10/1997 | Sacripante et al. | |
| 5,744,269 A | 4/1998 | Bhattacharya et al. | |
| 5,889,162 A | 3/1999 | Hays | |
| 6,235,100 B1 | 5/2001 | Hays | |
| 6,270,884 B1 | 8/2001 | Guhde et al. | |
| 6,669,984 B2 | 12/2003 | Anchor et al. | |
| 6,897,251 B2 | 5/2005 | Boisseau et al. | |
| 6,899,757 B2 | 5/2005 | Chang et al. | |
| 6,946,028 B1 | 9/2005 | Craig | |
| 6,958,091 B1 | 10/2005 | Craig | |
| 2004/0166047 A1 | 8/2004 | Vogels et al. | |
| 2007/0167535 A1 | 7/2007 | Poppe et al. | |
| 2008/0095705 A1* | 4/2008 | Virtanen et al. | 424/9.1 |

FOREIGN PATENT DOCUMENTS

| | | |
|---|---|---|
| WO | 2005054380 | 6/2005 |
| WO | 2006051153 | 5/2006 |
| WO | 2006131493 | 12/2006 |

OTHER PUBLICATIONS

Nelen, Substitution of Metal Ions in Anionic Surfactants by Ion-Exchange Reactions in Non-aqueous Solvents, Bull. Soc.Chim. Belg., vol. 88, accepted Jun. 4, 1979.

* cited by examiner

*Primary Examiner* — Bijan Ahvazi
*Assistant Examiner* — S. Camilla Pourbohloul
(74) *Attorney, Agent, or Firm* — Thorpe, North & Western L.L.P.

(57) ABSTRACT

A charge director material for charging a liquid toner, the charge director material comprising (a) nanoparticles of a simple salt and (b) a sulfosuccinate salt of the general formula $MA_n$, wherein M is a metal, n is the valence of M, and A is an ion of the general formula (I)

$$[R_1-O-C(O)CH_2CH(SO_3^-)C(O)-O-R_2], \qquad (I)$$

wherein each of $R_1$ and $R_2$ is an alkyl group;
said charge director material being substantially free of acids of the general formula (I), wherein one or both of R1 and R2 is hydrogen, and if only one of them is hydrogen, the other is an alkyl group.

12 Claims, 4 Drawing Sheets

CHARGE DIRECTOR FOR LIQUID TONER

RELATED APPLICATIONS

This application claims priority to, and is a US National Phase of, International Patent Application No. PCT/US2006/018297, having title "CHARGE DIRECTOR FOR LIQUID TONER", having been filed on 10 May 2006 and having PCT Publication No. WO2007/130069, commonly assigned herewith, and hereby incorporated by reference.

FIELD OF THE INVENTION

The present application discloses charge directors in liquid electrography, some chemical materials useful as such charge directors, and methods for obtaining and using said materials.

BACKGROUND OF THE INVENTION

In many printing systems, it is common practice to develop a hardcopy of an image by using a photoconductive surface. The photoconductive surface is selectively charged with a latent electrostatic image having image and background areas. A liquid developer comprising charged toner particles in a carrier liquid is brought into contact with the selectively charged photoconductive surface. The charged toner particles adhere to the image areas of the latent image while the background areas remain clean. A hardcopy material (e.g. paper) is brought directly or indirectly into contact with the photoconductive surface in order to transfer the latent image. Variations of this method utilize different ways for forming the electrostatic latent image on a photoreceptor or on a dielectric material.

Typically the liquid developer (also referred to herein as ink or toner) comprises a thermoplastic resin (polymer) as the basis for the toner particles (also referred to herein as ink particles), and a non-polar liquid as a carrier liquid in which the toner particles are dispersed. Generally, the toner particles contain a colorant such as a pigment.

A charge director, also called charge control agent or imaging agent, is also added to the dispersion to induce charge on the particles. As known in the art, a charge adjuvant may be added to increase the charging effect of the charge director.

US 2004/0241567, the disclosure of which is incorporated herein by reference, describes a liquid developer for image forming apparatus, and mentions that "[o]ther charge control agents to be used include: metal salts of dialkyl sulfosuccinate . . . ".

U.S. Pat. No. 4,585,535, and its divisional, U.S. Pat. No. 4,719,026 the disclosures of both are incorporated herein by reference, relate to a method of electrophoretically depositing a ferromagnetic material on a tape to produce high density recording media, and explains that "[t]here are two apparently different kinds of charge directors. In the first, the charge director in ISOPAR has a conductivity measured at 1 kHz that is larger than the conductivity obtained when it is mixed with toner particles. Lecithin and barium petronate are examples. In second case, the charge director in ISOPAR has almost no conductivity . . . . Barium sulfocuccinate (BaOT) and salts of bistridecyl sulfosuccinate are examples of this case."

Synthesis of various metal salts of di-2-ethyl-hexyl-sulfosuccinate salts from sodium salts of same anion is described in Bull. Soc. Chim. Belg. 1979, 88(1-2), 31-36 the disclosure of which is incorporated herein by reference.

Other documents that relate to salts of bistridecyl sulfosuccinate are: U.S. Pat. No. 6,669,984, U.S. Pat. No. 6,270,884, U.S. Pat. No. 5,246,916, U.S. Pat. No. 4,990,416; U.S. Pat. No. 6,958,091, U.S. Pat. No. 6,946,028; U.S. Pat. No. 6,899,757, U.S. Pat. No. 6,897,251, U.S. Pat. No. 6,235,100, U.S. Pat. No. 5,889,162, U.S. Pat. No. 5,679,724, U.S. Pat. No. 5,595,723, U.S. Pat. No. 5,558,855, and U.S. Pat. No. 4,766,061, the disclosures of all of which are incorporated herein by reference.

SUMMARY OF THE INVENTION

An aspect of some embodiments of the present invention is the provision of a novel charge director material for use in liquid electrographic system. Charge directors according to this aspect have one chemical charging component. Many of the prior art charge directors are mixtures of several charge director components having different chemistries.

A possible disadvantage of using a mixture of materials as charge director is the possibility of selective adsorption of certain charge director components onto the surface of the ink particles. This may lead to differential depletion of the components responsive to their affinity to the ink particles. Therefore, a non-controllable change in the charge director composition may be expected during continuous printing process. This may adversely affect the long term characteristics of the charge director and reflected in degraded print quality.

A system of electrically stabilized charge director containing one charge director component, may be free of the above described drawbacks and therefore, the charge director concentration in the carrier liquid may be easily controlled. Another possible advantage is chemical stability during short or long term printing operation in the press.

Many prior art charge directors include a component based on soybean extract. Such prior art charge directors may suffer from gradual irreversible adherence of the soybean extract onto the photoconductor surface, which may be reflected in lateral conductivity on the photoconductor, resulting in degraded print quality. Many non-synthetic charge director components are highly sensitive to water, and therefore, the ink or toner comprising them may change its conductivity upon changes in humidity.

An aspect of some embodiments of the present invention is provision of a charge director material comprising at least one micelle forming salt and nanoparticles of a simple salt. Simple salts are salts that do not form micelles by themselves, although they may form a core for micelles with a micelle forming salt. The ions constructing them are all hydrophilic. Non-limiting examples for cations and anions of simple salts are $Mg^{+2}$ $Ca^{+2}$, $Ba^{+2}$, $NH_4^+$, $Li^+$, $Al^{+3}$, tetrabutyl ammonium, $Cl^-$, $Br^-I^-$, $SO_4^{-2}$, $PO_4^{-3}$, $CO_3^{-2}$, $HPO_4^{-2}$, $H_2PO_4^-$, trifluoroacetate, and $TiO_3^{-4}$.

Optionally, the micelle forming salt is a salt of a dialkyl ester of succinic acid. In some embodiments of the invention, the charge director material is free of acidic hydrolysis products of the diester. While the alcoholic products of hydrolysis may be tolerated, and in some cases even beneficial, being free of acidic hydrolysis products appears to be highly advantageous in these embodiments, whether the acidic hydrolysis products appear in the charge director material as result of hydrolysis, or because of any other reason. Absence of acidic hydrolysis products increases the charging of the charge director, lengthens its shelf life, and may decrease the charge director sensitivity to humidity and to some pigments.

In an aspect of some embodiments of the invention, the micelle forming salt is of the general formula $MA_n$, wherein M is a metal, n is the valence of M, and A is an ion of the general formula (I)

$$[R_1-O-C(O)CH_2CH(SO_3^-)C(O)-O-R_2], \quad (I)$$

wherein each of $R_1$ and $R_2$ is an alkyl group.

In an exemplary embodiment, the charge director material is further characterized in being substantially free of acids that are of the general formula (I) above, but one or both of $R_1$ and $R_2$ is hydrogen.

In some embodiments it is also advantageous to have the charge director material free of the acid HA, where A is as defined above. This may lengthen the shelf life of the charge director material, increase its charging capability, and improve print quality.

In exemplary embodiments, the charge director material includes micelles of the micelle forming salt(s), the micelles enclosing nanoparticles of the simple salt.

An aspect of some embodiments of the present invention is a method for obtaining a charge director material from a metal salt of dialkyl sulfosuccinate. This method includes: reacting the metal salt with a strong acid to obtain a dialkyl sulfosuccinic acid, and reacting the obtained acid with a strong base to obtain charge director material.

In this method, one may obtain charge director material that is free of acidic hydrolysis products, by using a strong base in smaller amounts than required to react all the protons in the system. Full neutralization may be achieved without producing meaningful hydrolysis by further reaction of the unreacted protons with a weaker base.

To improve reproducibility of the method, it may be advisable to workup the sulfoccinic acid before it is reacted with a base, such that anions of the strong acid are removed before the base is added. It was surprisingly found that compounds obtained this way were poor charge directors. To improve charging, it is possible to add or otherwise provide nanoparticles of a simple salt to the poor charge director. Additionally or alternatively, the reaction with the base may be carried out in the presence of another ionic substance (other than a metal salt of dialkyl sulfosuccinate) that may react with the base to provide the nanoparticles.

In an embodiment of the invention, nanoparticles are provided in a stabilized state, for instance, with a micelle forming substance stabilizing them.

Another aspect of some embodiments of the present invention is a method for obtaining a charge director material by transmetallation in polar solvent, in the presence of a nano particle source, such as a partially soluble salt.

Another aspect of some embodiments of the present invention is a liquid developer comprising charge director material in accordance with the present invention. In exemplary embodiments, the liquid developer may be of the kind disclosed in U.S. Pat. No. 5,346,796, the disclosure of which is incorporated herein by reference, with a charge director of the present invention replacing the charge director mentioned in the reference. The developer with the presently disclosed charge director was found to have many advantages on the developer that was prepared exactly according to the prior art. It gave less background printing, images with sharper edges, and proved much less water-sensitive. Furthermore, a liquid developer of the invention was able to retain a constant ink particle charge, while printing low coverage impressions in a much greater number than obtained with a prior art charge director.

Another aspect of some embodiments of the invention is a substrate printed with a liquid developer that includes a charge director according to the invention.

There is thus provided, in accordance with an embodiment of the invention a charge director material for charging a liquid toner, the charge director material comprising (a) nanoparticles of a simple salt and (b) a sulfosuccinate salt of the general formula $MA_n$, wherein M is a metal, n is the valence of M, and A is an ion of the general formula (I)

$$[R_1\text{—}O\text{—}C(O)CH_2CH(SO_3^-)C(O)\text{—}O\text{—}R_2], \quad (I)$$

wherein each of $R_1$ and $R_2$ is an alkyl group;

said charge director material being substantially free of acids of the general formula (I), wherein one or both of R1 and R2 is hydrogen, and if only one of them is hydrogen, the other is an alkyl group.

There is further provided, in accordance with an embodiment of the invention, a charge director material for charging a liquid toner the charge director material comprising (a) nanoparticles of a simple salt; (b) a first micelle forming substance, being sulfosuccinate salt of the general formula $MA_n$, wherein M is a metal, n is the valence of M, and A is an ion of the general formula (I)

$$[R_1\text{—}O\text{—}C(O)CH_2CH(SO_3^-)C(O)\text{—}O\text{—}R_2], \quad (I)$$

wherein each of $R_1$ and $R_2$ is an alkyl group; and (c) a second micelle forming substance.

In an embodiment of the invention, the second micelle forming compound is basic barium petronate.

Optionally, the charge director material is substantially free of an acid of the general formula HA.

In an embodiment of the invention, the charge director material comprises micelles of said sulfosuccinate salt enclosing said nanoparticles.

Optionally, the average size of said nanoparticles is 200 nm or less. Optionally, the average size of said nanoparticles is 2 nm or more.

In an embodiment of the invention said simple salt has a cation selected from the group consisting of $Mg^{+2}$, $Ca^{+2}$, $Ba^{+2}$, $NH_4^+$, tert-butyl ammonium, $Li^+$, and $Al^{+3}$, or from any sub-group thereof.

In an embodiment of the invention, said simple salt has an anion selected from the group consisting of $SO_4^{-2}$, $PO_4^{-3}$, $NO_3^-$, $HPO_4^{-2}$, $CO_3^{-2}$, acetate, trifluoroacetate (TFA), $Cl^-$, $Br^-$, $I^-$, $ClO_4^-$, and $TiO_3^{-4}$, or from any sub-group thereof.

In an embodiment of the invention, said first salt is selected from the group consisting of $CaCO_3$, $Ba_2TiO_3$, $Al_2(SO_4)_3$, $Al(NO_3)_3$, $Ca_3(PO4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof.

In an embodiment of the invention, said simple salt is $BaSO_4$ or BaHPO4. Optionally, said simple salt is $BaHPO_4$.

Optionally, the charge director further comprises basic barium petronate (BBP).

There is further provided, in accordance with an embodiment of the invention, a chemical material comprising nanoparticles of a simple salt enclosed in micelles, the micelles comprising a metal salt of dialkyl sulfosuccinate salt other than di-2-ethyl-hexyl-sulfosuccinate.

In an embodiment of the invention, the simple salt is of the general formula $M'_p\alpha_q$, wherein M' is a metal the same as or different than M, α is an anion, p and q are stoichiometric coefficients that ensure electrical balance of the salt, and wherein an acid Hα has no proton with $pK_a$ smaller than 1. Optionally, the simple salt is $BaHPO_4$. Optionally, the simple salt is $BaCO_3$ and at least some of the micelles include basic barium petronate.

Optionally, each of $R_1$ and $R_2$ is an aliphatic alkyl group.

Optionally, each of $R_1$ and $R_2$ independently is a $C_{6-25}$ alkyl.

Optionally, said aliphatic alkyl group is linear. Optionally, said aliphatic alkyl group is branched. Optionally, said aliphatic alkyl group includes a linear chain of more than 6 carbon atoms.

In an embodiment of the invention, $R_1$ and $R_2$ are the same. Optionally, at least one of $R_1$ and $R_2$ is $C_{13}H_{27}$.

In an embodiment of the invention M is Na, K, Cs, Ca, or Ba.

There is further provided, in accordance with an embodiment of the invention, a use of a material according to the invention as a charge director in liquid developer.

There is further provided, in accordance with an embodiment of the invention, a method for obtaining in a polar solvent a material comprising (a) nanoparticles of a simple salt and (b) a sulfosuccinate salt of the general formula $MA_n$, wherein M is a metal, n is the valence of M, and A is an ion of the general formula (I)

$$[R_1\text{—O—C(O)CH}_2\text{CH(SO}_3^-\text{)C(O)—O—R}_2], \quad (I)$$

wherein each of $R_1$ and $R_2$ is an alkyl group;
the method comprising:
(i) providing a sulfosuccinate salt of the general formula $M'A_{n'}$, M' being a metal other than the metal M and n' being the valence of M'; and
(ii) reacting the salt $M'A_{n'}$, with a salt $M_pX_q$ in said polar solvent in the presence of a the simple salt.

In an embodiment of the invention, the solubility of the salt $MA_n$, in the polar solvent is (a) lower than the solubility in same solvent of the salt $M'A_{n'}$, and (b) lower than the solubility in same solvent of the salt $M_pX_q$.

Optionally, the reaction of the salt $M'A_{n'}$ with the salt $M_pX_q$ is carried out in the presence of a simple salt selected from $CaCO_3$, $CaSO_4$, $(NH_4)_2CO_3$, $(NH_4)_2SO_4$, $NH_4OAc$, Tert-butyl ammonium bromide, $NH_4NO_3$, Barium Titanate, LiTFA, $Al(NO_3)_3$, $Al_2(SO_4)_3$, $Ca_3(PO_4)_2$, $LiClO_4$ and $LiBF_4$.

Optionally, X is $NO_3^-$, or $ClO_4^-$.

Optionally, said polar solvent is methanol, water, or mixture thereof.

In an embodiment of the invention, the obtained charge director material is substantially free of acids of the general formula (I)

$$[R_1\text{—O—C(O)CH}_2\text{CH(SO}_3^-\text{)C(O)—OR}_2], \quad (I)$$

wherein one or both of $R_1$ and $R_2$ is hydrogen, and if only one of them is hydrogen, the other is an alkyl group.

In an embodiment of the invention, the obtained charge director material comprises micelles of said sulfosuccinate salt enclosing said nanoparticle.

There is further provided, in accordance with an embodiment of the invention, a method for obtaining a material comprising (i) nanoparticles of a simple salt and (ii) a sulfosuccinate salt of the general formula $MA_n$, wherein M is a metal, n is the valence of M, and A is an ion of the general formula (I)

$$[R_1\text{—O—C(O)CH}_2\text{CH(SO}_3^-\text{)C(O)—O—R}_2], \quad (I)$$

wherein each of $R_1$ and $R_2$ is an alkyl group;
the method comprising:
(a) providing a sulfosuccinate salt of the general formula $M'A_{n'}$, M' being a metal other than the metal M and n' being the valence of M',
(b) adding strong acid as to obtain an acid HA; and
(c) adding a strong base as to neutralize 30-85%.

Optionally, the strong base is added to neutralize 50-80% of acids.

Optionally, the method further comprises:
(d) evaporating solvents to obtain the material in solid form, and optionally performing an aqueous workup on the solid obtained.

Optionally, the method further comprises:
(d) filtering to obtain solid product, and optionally performing on the solid obtained aqueous workup.

Optionally, said strong acid has at least one proton with a $pK_a$ smaller than 1.

There is further provided, in accordance with an embodiment of the invention, a method for obtaining a chemical material of the general formula $M_pX_q@MA_n$ in a reaction mixture, wherein M is a metal, X is an anion, n is the valence of M, and p and q are coefficients that ensures that $M_pX_q$ is electrically balanced, and A is a compound of the general formula (I)

$$[R_1\text{—O—C(O)CH}_2\text{CH(SO}_3^-\text{)C(O)—O—R}_2], \quad (I)$$

wherein $R_1$ and $R_2$ are alkyl groups,
the method comprising:
(a) providing a sulfosuccinate salt of the general formula $M'A_{n'}$, wherein M' is a metal other than M and n' the valence of M';
(b) ading a strong acid, having at least one $pK_a$ smaller than 1, to obtain a first reaction mixture containing a sulfonic acid of the general formula HA;
(c) working up the obtained reaction mixture to obtain substantially pure HA; and
(d) adding a predetermined amount of base $M(OH)_n$, in the presence of an ionic substance, as to obtain a second reaction mixture containing a chemical material of the general formula $M_pX_q@MA_n$.

Optionally, the predetermined amount of base is such that the obtained chemical material is substantially free of acids of the general formula (I), wherein one or both of $R_1$ and $R_2$ is hydrogen, and if only one of them is hydrogen, the other is an alkyl group.

Optionally, the predetermined amount of base is from 30% to 85% of an amount required to obtain a neutral second reaction mixture.

Optionally, the strong acid is $H_2SO_4$.

Optionally, said ionic substance is an acid. Optionally, the ionic substance is $H_2SO_4$ or $H_3PO_4$.

Optionally, in (b) substantially all the sulfosuccinate salt is converted to acid.

In an embodiment of the invention, the method also includes reacting the remaining acid HA with a non hydroxyl base. Optionally, the non-hydroxyl base is triethyl amine, barium isopropoxide, aluminum isopropoxide or mixture thereof.

There is further provided, in accordance with an embodiment of the invention, a method for obtaining a charge director material for liquid toner, the method comprising:
(a) providing a first micelle forming substance, being sulfosuccinate salt of the general formula $MA_n$, wherein M is a metal, n is the valence of M, and A is an ion of the general formula (I)

$$[R_1\text{—O—C(O)CH}_2\text{CH(SO}_3^-\text{)C(O)—O—R}_2], \quad (I)$$

wherein each of $R_1$ and $R_2$ is an alkyl group; and
(b) adding to the first micelle forming substance nanoparticles of a simple salt stabilized by a second micelle forming substance.

Optionally, the simple salt is $BaCO_3$.

Optionally, the second micelle forming substance is basic barium petronate.

Optionally, each of $R_1$ and $R_2$ is an aliphatic alkyl.

Optionally, each of $R_1$ and $R_2$ independently is a $C_{6-25}$ alkyl.

Optionally, the aliphatic alkyl is linear.

Optionally, the aliphatic alkyl is branched.

Optionally, the aliphatic alkyl group comprises a linear chain of more than 6 carbon atoms.

Optionally, $R_1$ and $R_2$ are the same. Optionally, each of $R_1$ and $R_2$ is $C_{13}H_{27}$.

In an embodiment of the invention, M is Na, K, Cs, Ca, or Ba.

Optionally, M' is Na.

In an embodiment of the invention, the salt has a cation selected from the group consisting of $Mg^{+2}$, $Ca^{+2}$, $Ba^{+2}$, $NH_4^+$, $Li^+$, and $Al^{+3}$ or from any sub-group thereof.

In an embodiment of the invention, the salt has an anion selected from the group consisting of $SO_4^{-2}$, $PO_4^{-3}$, $CO_3^{-2}$, and $TiO_3^{-4}$, or from any sub-group thereof.

Optionally, the salt is selected from the group consisting of $CaCO_3$, $Ba_2TiO_3$, $Al_2(SO_4)_3$, $Al(NO_3)_3$, and $Ca_3(PO4)_2$, $BaSO_4$, $BaHPO_4$, and $Ba_2(PO_4)_3$, or any sub-group thereof.

There is further provided, in accordance with an embodiment of the invention, a toner comprising a carrier liquid and toner particles charged by a charge director material according to the invention or produced by a method according to the invention.

There is further provided, in accordance with an embodiment of the invention, a method for obtaining a printed substrate, comprising printing said substrate with toner according to the invention There is further provided a substrate comprising an image printed with toner according to the invention.

BRIEF DESCRIPTION OF THE DRAWINGS

Exemplary non-limiting embodiments of the invention are described in the following description, read with reference to the figures attached hereto. Dimensions of components and features shown in the figures are chosen primarily for convenience and clarity of presentation and are not necessarily to scale. In the attached figures.

DETAILED DESCRIPTION OF EXEMPLARY EMBODIMENTS

Figure 1:
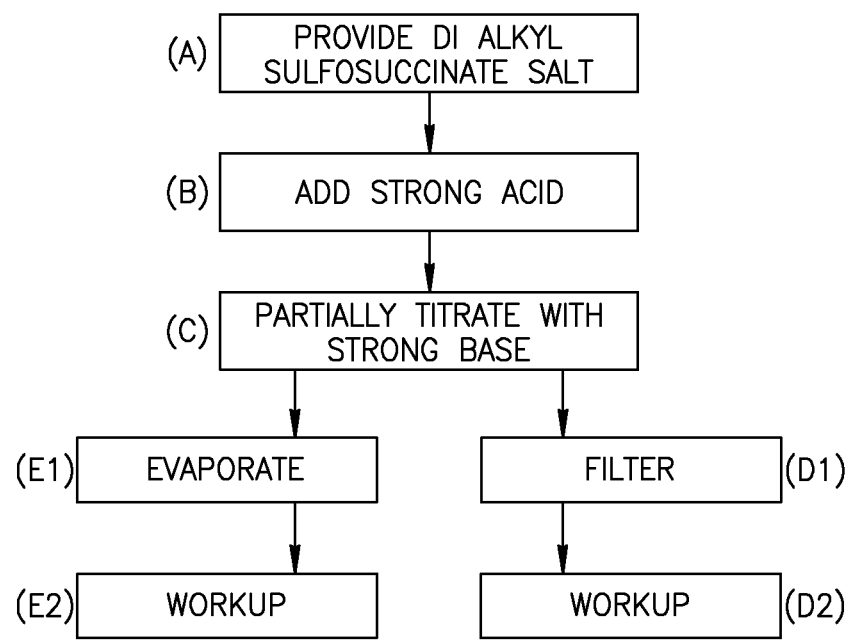
FIGS. 1-4 are flow charts of methods for producing a charge director compound according to exemplary embodiments of the invention.

In order to better understand the invention and to see how it may be carried out in practice, some exemplary embodiments will be described in detail hereinafter, as non-limiting examples only.

In the following, TR is used to denote di-bistridecylsufosuccinate anion and OT is used to denote dioctylsulfosuccinate anion. The solvent in all the reactions recited below was ISOPAR-L (Exxon), unless otherwise mentioned.

The term workup refers herein to aqueous workup, as this term is used in the field. It may include, for instance, rinsing of the worked up material with water, adding water immiscible organic solvent, separating the phases, evaporating the organic liquid, adding another organic solvent, and evaporating.

According to an exemplary embodiment of the invention there is provided a charge director material that includes a micelle forming salt enclosing nanoparticles of a simple salt.

In this embodiment, the micelle forming salt is a salt of a dialkylsulfosuccinate other than di-2-ethyl-hexyl-sulfosuccinate.

The nanoparticles of the simple salt are preferably particles of sub-micron size. Particles having volume-weighted average diameter of between about 2 nm and about 200 nm are preferred.

In an exemplary embodiment, the micelle forming salt is a salt of a di-alkyl ester of succinic acid, and the charge director material is free of hydrolysis products of the di-ester.

A material is considered free or substantially free of a certain compound if this compound exists in it in amounts that do not substantially influence the charging capability of the material, its shelf life, ink charging stability and/or the reproducibility of its production. Quantitatively this generally implies that the compound constitutes no more than 1%, 2% or 5% w/w relative to the dialkyl sulfosuccinate salt or acid.

It has been found that with 1% hydrolysis products the charging capability of the charge director is about 5% lower than that of the same charge director with no hydrolysis products. Existence of 5% hydrolysis products results in about 25% reduction in charging, while existence of about 8% may cause the charge director to be practically non-effective.

In an exemplary embodiment, the organic salt is of the general formula $MA_n$, wherein M is a metal, n is the valence of M, and A is an ion of the general formula (I)

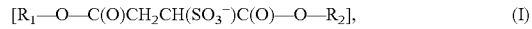

$$[R_1\text{—}O\text{—}C(O)CH_2CH(SO_3^-)C(O)\text{—}O\text{—}R_2], \quad (I)$$

wherein each of $R_1$ and $R_2$ is an alkyl group.

In this embodiment, the above-mentioned acidic hydrolysis products are of the same general formula (I), but with at least one of $R_1$ and $R_2$ being an hydrogen.

It may be of further advantage to have the charge director material free of the sulfonic acid HA, where A is as defined above.

The charge director material according to these embodiments was found to include micelles of the micelle forming salt, and these micelles (or at least some of them) enclose nanoparticles of the simple salt.

Non-limiting examples for the metal M are Na, K, Cs, Ca, and Ba.

As for the di-alkyl ester, the two alkyl groups it contains may be the same or different, and in exemplary embodiments have from about 6 to about 25 carbon atoms. The alkyl groups may be linear or branched, and may include cyclic portions. Each one of the alkyl groups may be aliphatic or include aromatic groups, either as part of its backbone or as substituents. Each of the alkyl groups is optionally substituted, and non-limiting examples of possible substituents are halide, such as F, Cl, Br, and I, hydroxy, $C_{1-6}$alkoxy, $C_{1-6}$alkyl sulfonate, $C_{1-6}$ fluorinated alkyl, $CF_3$, and $NO_2$.

Alkyl groups with linear chains of at least 8 carbon atoms, whether these chains are substituted with shorter alkyls or not, are preferable over alkyl groups having linear chains of up to 6 carbon atoms. For instance, in concentration of 5 mg CD/g solids $Ba(TR)_2$ charged toner particles to particle charge of about 350 pS/cm, while $Ba(OT)_2$ charged similar toner particles only to about 50 pS/cm. With other metals, the advantage of TR salts on OT salt was even more pronounced. The TR has a linear chain of 12 carbon atoms, while the longest linear chain of the OT is of 6 carbons.

Table 1 below summarizes the conductivity measured with some charge director materials according to the invention. In the examples listed in table 1 the nanoparticles are sulfate salts, and their cation is that of the micelle forming salt.

TABLE 1

Charging characteristics with metal salts of OT and TR (50 mg charge director material per 1 g ink solids; conductivities in pS/cm)

| Micelle forming salt | Black ink 3.2 | | | Yellow ink 3.1 | | |
|---|---|---|---|---|---|---|
| | PC pS/cm | LF pS/cm | DC | PC | LF | DC |
| KOT | 160 | 17 | | 153 | 19 | 18 |
| KTR | 200 | 35 | 3 | 182 | 38 | 10 |
| Ca(OT)$_2$ | 68 | 20 | 16 | 161 | 27 | 22 |
| Ca(TR)$_2$ | 242 | 33 | 7 | 231 | 41 | 7 |
| Ba(OT)$_2$ | 353 | 68 | 27 | 316 | 93 | 38 |
| Ba(TR)$_2$ | 403 | 142 | 17 | 374 | 129 | 12 |
| Cr(OT)$_3$ | −3 | 50 | 23 | 28 | 42 | 28 |
| Mn(OT)$_2$ | 57 | 18 | 11 | 165 | 39 | 35 |
| CsOT | 154 | 26 | 22 | 200 | 43 | 33 |
| LiOT | 62 | 18 | 15 | 186 | 45 | 28 |
| Al(OT)$_3$ | 0 | 25 | 13 | 12 | 60 | 28 |
| Al(TR)$_3$ | 36 | 43 | 12 | 109 | 74 | 14 |

LF denotes low field conductivity, DC denotes residual direct current conductivity, and PC—particle charge, defined as the difference between high field and low field conductivities. The high field conductivity is measured in electrical field of 1500V/mm. It is generally accepted in the art that in order to be an effective charge director in liquid ink systems, a charge director should be characterized as follows: PC from about 70 to about 400 pS/cm; LF from about 15 to about 110 pS/cm; and DC<20 pS/cm.

In accordance with an embodiment of the invention, toners are produced by adding between 1 and 100 mg charge director per g of ink solids of charge director to toner particles produced in accordance with U.S. Pat. No. 5,192,638; U.S. Pat. No. 5,923,929; and U.S. Pat. No. 6,479,205, the disclosures of all of which are incorporated herein by reference.

In an embodiment of the invention, a charge director is provided by acidification of a micelle forming salt M'A$_{n'}$, followed by titration of the acidification product. A flow chart describing this synthesis route is provided in FIG. 1. The obtained charge director material comprises nanoparticles of a simple salt enclosed in micelles of a micelle forming salt MA. The charge director material is obtained from the salt M'A$_{n'}$ ((A) in FIG. 1) by acidification with strong acid (B), for instance, sulfuric, to obtain the acid HA. Then, (C), the acid HA is reacted with a strong base, for instance, Ba(OH)$_2$ to obtain the charge director material. To prevent formation of hydrolysis products, only part of the acid HA is reacted with the strong base. Further neutralization may be achieved by reacting the rest of the acid with a weaker base. Conventional care measures, such as carrying the reaction in ice bath, using dry reagents, and adding the reagents gradually, do not substantially prevent hydrolysis. If the further neutralization is carried out to completion, the obtained charge director is substantially free of the acid HA. After titration, the product may be isolated in any way known in the art per se. For instance, it may be filtered (D1), and the solid filtrate worked up (D2) to obtain a clean charge director material. Alternatively, the solvent may be evaporated (E1), and the remaining material worked up (E2) to obtain a clean charge director material.

Following is a full protocol of a synthesis according to this embodiment:

10 g of NaTR (0.017 mole) were dissolved in 200 ml ethanol for 20 min. If the solution was not clear it was filtered. Then, 0.84 g concentrated H$_2$SO$_4$ in 40 ml ether was added. The solution was stored in the freezer for overnight.

The solid residue was filtered and the clear solution was titrated with 0.1 M Ba(OH)$_2$ solution (in methanol) to a pH of about 6 (58 ml of Ba(OH)$_2$).

The solution was evaporated and the residue was dried by repetitive dissolution/evaporation in toluene and Hexane.

Such a synthesis route is illustrated in scheme 1 below.

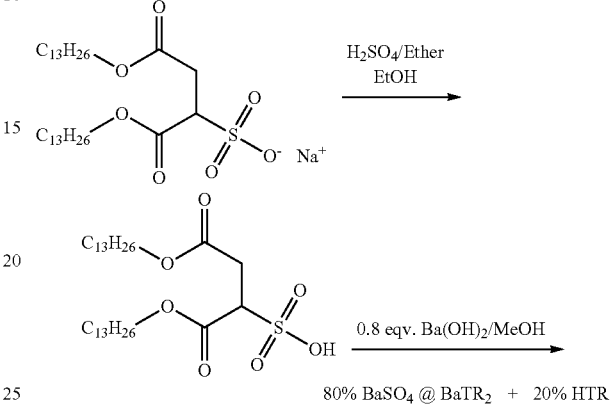

Scheme 1

Some charge director materials in accordance with embodiments of the present invention may also be obtained by transmetallation of a micelle forming salt in polar solvent, in the presence of a salt that may be a source of nanoparticles. The reaction involves three starting materials that are salts: a micelle forming salt; a cation replacing salt; and a nanoparticle source salt. The first two are preferably soluble in the polar solvent, while the latter is preferably non-soluble in it or only slightly soluble. The reaction is expected to have higher yield if the micelle forming salt that forms has a K$_{sp}$ of $10^{-8}$ or less, in the polar solvent.

Such a method may include providing a sulfosuccinate salt (for instance, a commercially available one), and adding to it two salts. Preferably, the cation of one of the salts, when combined with the anion of the micelle forming salt, forms a product having very low solubility in the polar solvent. The other salt is selected to provide the nanoparticles required in the charge director material. The two salts may be the same, but it is often easier to carry out the reaction with two different salts. For example, the micelle forming salt may be a sulfosuccinate salt of the general formula M'A$_{n'}$, wherein M' is a metal other than the metal M recited above and n' is the valence of M'. In such case, the method includes reacting the salt M'A$_{n'}$ with a salt M$_p$X$_q$ in the polar solvent, in the presence of another salt, which will be referred herein as a nanoparticle forming salt. The salt MpXq is to be selected such that its solubility in the polar solvent is preferably than solubility of the salt MA$_n$ in the polar solvent. Here, X denotes an anion, and p and q are stoichiometric coefficients that ensure the salt to be electrically balanced.

Non-limiting examples of polar solvents suitable for use in the above-described method are methanol, water, and mixture thereof.

In exemplary embodiments, M' is Na, and M is K, Cs, Ca, Ba, or Al. Na was chosen as there are commercially obtainable sodium salts of some di-alkyl esters of sulfoccinic acids, but other cations may also be useful, if salts are available.

Non-limiting examples for cations and anions of the nanoparticle forming salt include Mg$^{+2}$, Ca$^{+2}$, Ba$^{+2}$, NH$_4^+$, Tert-butyl ammonium, Li$^+$, and Al$^+$ and SO$_4^{-2}$, PO$_4^{-3}$, CO$_3^{-2}$, $NO_3^-$ trifluoro acetate, and $TiO_3^{-4}$ Non limiting examples for nanoparticle forming salts include $CaCO_3$, $CaSO_4$, $(NH_4)_2CO_3$, $(NH_4)_2SO_4$, $NH_4OAc$, Tert-butyl ammonium bromide, $NH_4NO_3$, Barium Titanate, LiTFA, $Al(NO_3)_3$, $Al_2(SO_4)_3$, $Ca_3(PO_4)_2$, $LiClO_4$ and $LiBF_4$.

Nanoparticle forming salt is added as powder, and if the salt is stable in the form of nanoparticles, as are some titanate salts, it is preferable to add it in this form.

Non-limiting examples for salts that are suitable as cation replacers for reacting with the micelle formins salt are $Ba(ClO_4)_2$ and $Ba(NO_3)_2$.

Figure 2:
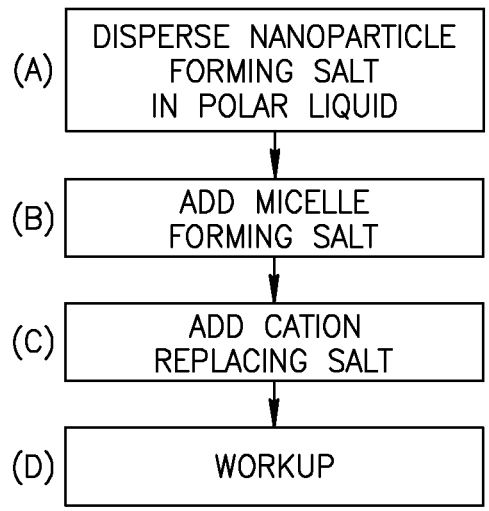

A method according to a transmetallation embodiment may be summarized in the flow-chart of FIG. 2, wherein (A) is the dispersion of the nanoparticle forming salt in a polar solvent, (B) is addition of di alkyl sulfoxuccinate salt to the dispersion obtained in 1, (C) is the addition of a salt having a cation that should replace the cation of the sulfosuccinate salt, for instance a barium salt, and (D) is aqueous workup.

The following is an exemplary full protocol for obtaining charge director material by transmetallation:

2 g $CaCO_3$ are crusher as finely as possible, added to 200 ml 50% methanol in water, and stirred vigorously for 20 minutes (solution will remain heterogeneous).

0.4 g solid NaTR are added and the mixture stirred until dissolved. 0.14 g $Ba(ClO_4)_2$ (Sigma) are added and the mixture stirred for 1-2 h. The obtained solution is extracted with at least 3*75 ml hexane (Fruatrom, Aldrich, or BioLab), dried with sodium sulfate (Merck) and evaporatee to dryness to get $CaCO_3$@$BaTR_2$.

To prepare NaTR for use in the reaction commercial Aerosol TR-70 (NaTR, Cytec) is evaporated; dried in a lyophilizer (ca. 0.2 Torr) or vacuumed over at 40° C. (ca. 20 Torr) to give the solid NaTR.

A transmetallation procedure is summarized in scheme 2.

Scheme 2

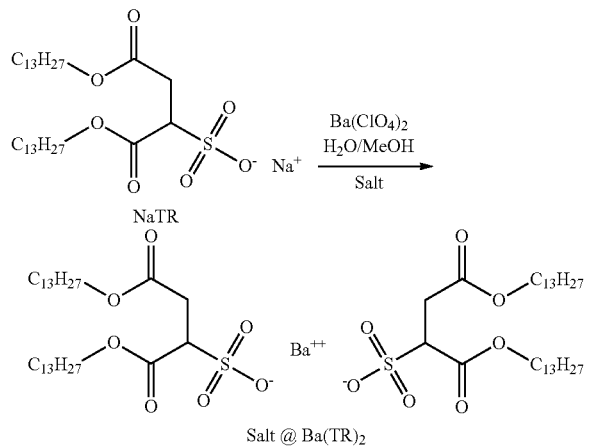

This procedure does not initiate any formation of hydrolysis products or sulfosuccinic acid HA. Therefore, the obtained charge director material is substantially free of them.

Table II below summarizes conductivities measured with charge director materials obtained by the method shown in scheme 2, with various nanoparticle forming salts, all in concentration of 20 mg charge director material per g solids. The micelle forming salt was $BaTR_2$. Without adding any salt, a pure $BaTR_2$ is obtained; and this is found to be of negligible charging effect.

TABLE II

| Salt | LFC | DC | PC |
|---|---|---|---|
| $CaCO_3$ | 9 | 1.8 | 109 |
| $CaSO_4$ | 7 | 0.9 | 9 |
| $(NH_4)_2CO_3$ | 10 | 1.4 | 44 |
| $(NH_4)_2SO_4$ | 9 | 1.1 | 71 |
| $NH_4OAc$ | 9 | 1.3 | 87 |
| Tert-butyl ammonium bromide (TBAB) | 10 | 3 | 50 |
| $NH_4NO_3$ | 10 | 0.9 | 74 |
| Barium Titanate (sub 2 mcm) | 10 | 0.7 | 100 |
| LiTFA | 7 | 0.9 | 64 |
| $Al(NO_3)_3$ | 8 | 0.7 | 27 |
| $Al_2(SO_4)_3$ | 8 | 0.8 | 14.6 |
| $Ca_3(PO_4)_2$ | 10 | 0.7 | 111 |
| $LiClO_4$ | 10 | 0.7 | 54 |
| $LiBF_4$ | 10 | 1 | 46 |

Additionally or alternatively, a charge director material according to an embodiment of the invention may be obtained by (1) reacting a dialkylsulfosuccinate salt M'A with a strong acid to obtain a reaction mixture containing dialkylsuccinate sulfonic acid, HA; (2) workup of the obtained reaction mixture to obtain substantially pure HA; and (3) reacting this substantially pure acid with a predetermined amount of a strong base $M(OH)_a$ in the presence of an ionic substance, such as an acid or metal salt. The quantity of nanoparticles obtained in the method may be increased or decreased by increasing or decreasing the amount of ionic substance used.

The required nanoparticles are believed to be formed from the anion of the ionic substance and the cation of the base. In some embodiments, the amount of base is predetermined to ensure that no hydrolysis products are obtained during the base-acid reaction. If it is desired to obtain a charge director material free of sulfsuccininc acid HA, the (initial) acid that is not reacted with the strong base may be further reacted with a weaker base, which less likely to catalyze hydrolysis of the ester. In this context a strong base is a base that has a hydroxyl base and a weak base has a alkoxy or amino base. Non-limiting examples of suitable weak bases are triethyl amine, pyridine, morpholine, aluminum isopropoxide, barium isopropoxide, barium t-butoxide, and calcium isoproxide.

Figure 3:
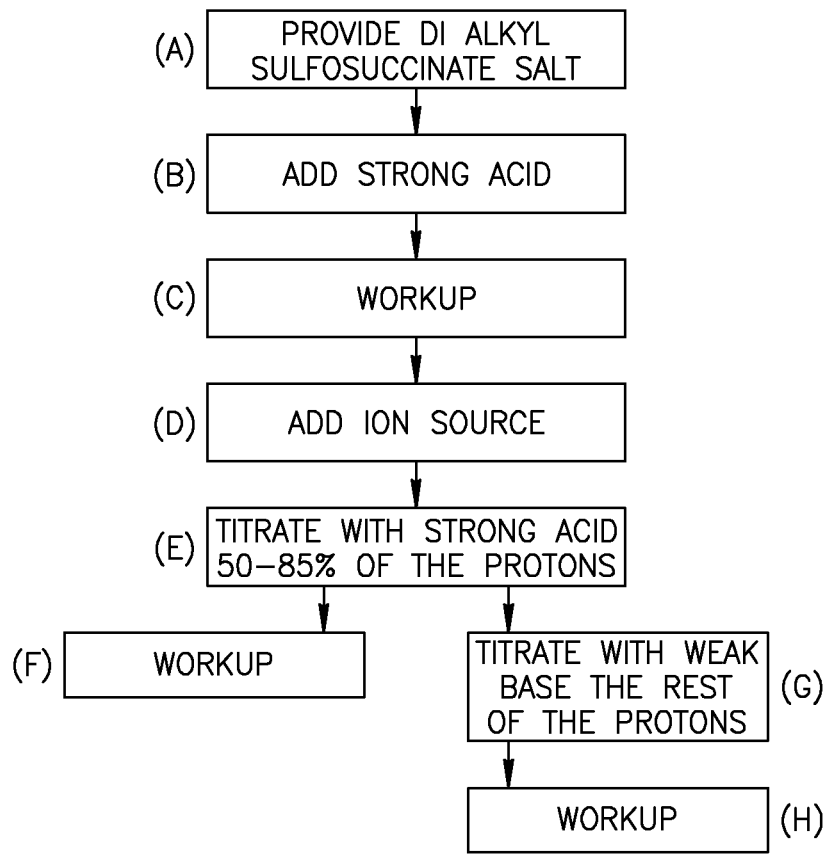

As shown in the flow chart of FIG. 3, such a method may include:

(a) providing a sulfosuccinate salt of the general formula $M'A_{n'}$, wherein M' is a metal other than M, n' the valence of M', M and A being as defined above;

(b) reacting the sulfosuccinate salt with a strong acid, to obtain a first reaction mixture containing a sulfonic acid of the general formula HA, (c) working up the obtained reaction mixture to obtain substantially pure HA;

(d) adding an ionic substance; and optionally (e) reacting the obtained substantially pure acid HA with a predetermined amount of base $M(OH)_n$, n being the valence of M, in the presence of the ionic substance added in (d) so as to obtain a second reaction mixture containing an organic salt MA and nanoparticles of a salt and being substantially free of acidic hydrolysis products. This second reaction mixture may be worked up to provide a dry charge director material, as shown in FIG. 3 under (F). In some embodiments, before the workup (F), the second reaction mixture is titrated with a weak base, as indicated in FIG. 3 under (G). This titration may be such that leaves in the reaction mixture less than 1% HA. Afterwards, the reaction mixture may be worked up (H).

An acid is considered strong, for the purpose of a reaction of the kind described in FIG. 3, if it has at least one proton with a $pK_a$ of 1 or less, preferably −1 or less. Non-limiting examples of suitable strong acids include HCl, HBr, and $H_2SO_4$. Any substance that may react with the base to give a salt may be used as ionic substances. These include, for instance, acids and metal salts. The acids should be strong enough and the salts soluble enough, to efficiently contribute anions for the formation of the nanoparticles. Nevertheless, the acids may be less strong than the acids used in the acidification of the starting material. For instance, phosphoric acid may be very satisfactory as an ionic substance, but does not generally qualify as a strong acid. Thus, according to some embodiments of the invention, provided are materials comprising nanoparticles of simple salts enclosed in micelles, wherein the conjugated acids of the simple salts are not strong acids as these are defined above.

Workup of the first reaction mixture may contain, for instance, filtration of the reaction mixture, concentrating the filtrate, drying, dissolving in a solvent, and repeating such steps with various solvents. In some embodiments, the workup may also contain crystallization of the acid. To ease the workup it may be helpful if, in the preceding stage, substantially all the salt MA is converted to acid HA. This might require substantive excess of strong acid. For instance, in the case of sulfuric acid, 3 equivalents of acid may be required.

In the context of this method, the sulfosuccinic acid HA is considered substantially pure if it is free of any anions of the strong acid.

In some embodiments, full neutralization of the acid HA with the base results in partial hydrolysis of the ester. In such embodiments, the predetermined amounts of base are preferably less than 1 equivalent of all the protons that the base should react with, for instance, between 0.5 and 0.85 eq.

The ionic substance may be acid, metal salt, mixtures thereof, or any other compound that would react with the base to form a salt. Non-limiting examples of suitable acids include $H_2SO_4$, $H_3PO_4$, $H_2CO_3$, formic acid, and $HClO_4$; and non-limiting examples of suitable salts include $Na_2SO_4$, $Na_2HPO_4$, $NaHCO_3$, NaCl, NaBr, NaI, and similar salts with K, Ca, Mg, Zn.

The following is an exemplary protocol for obtaining charge director material according to this method (keyed to FIG. 3):

A) Evaporate commercial Aerosol TR-70 (NaTR, Cytec) using an evaporator. Dry in a lyophilizer (ca. 0.2 Torr) or vacuum over at 40° C. (ca. 20 Torr) to give the solid NaTR. Dissolve NaTR (25 g) in ethanol (500 ml, absolute AR Aldrich, Fluka, Frutarom). If necessary, filter the solution. Add a solution of $H_2SO_4$ (4 ml, 96% Frutarom, Fluka) in ether (30 ml, Merck "dry") drop-wise. Let precipitate settle in freezer for 1-2 h. Gravimetrically filter the mixture and evaporate to ca. 5 ml. Dissolve residue in 200 ml ether, rinse with 2×50 ml of water, dry with anhydrous $Na_2SO_4$ (Anhydrous Aldrich, Merck) and evaporate to give HTR (ca. 95%). The obtained HTR may be stored as a 5% ethanolic solution.

B) Add 345 mg of an 85% $H_3PO_4$ (Merck) solution in water to 100 g of a 5% HTR solution in ethanol obtained in (A). Titrate to pH ~6 with 0.1 M $Ba(OH)_2$ (Octahydrate Merck, Aldrich, or Sigma). This amount of base reacts with about 80% of the protons in the mixture, including those of the HTR and those of the phosphoric acid, and may require about 65 ml $Ba(OH)_2$ solution). Evaporate solution to dryness, dissolve residue in 100 ml toluene (Frutarom,) and evaporate to dryness, dissolve residue in 100 ml n-hexane (Fruatrom,) and evaporate to dryness to obtain final product (ca. 94%). The product is stored as a 5% solution in Isopar-L (Exxon).

This procedure is summarized in scheme 3:

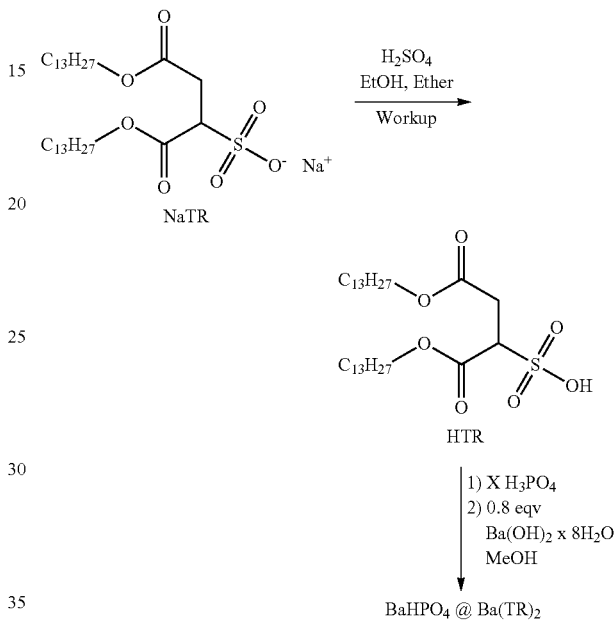

Scheme 3

An exemplary protocol for obtaining similar charge director material that is free of sulfoccinic acid HTR includes:

Add 69 mg (41 ul) 85% $H_3PO_4$ solution (0.6 mmol) to a solution of 20 g 5% HTR (1.8 mmol) in ethanol. Add slowly 14.4 ml 0.1 M $Ba(OH)_2$ in methanol.

Add 0.72 g 10% $NEt_3$ in ether and stir for 5 minutes. Evaporate solution to dryness, dissolve residue in 60 ml toluene and evaporate to dryness, dissolve residue in 60 ml hexane and evaporate to dryness.

Figure 4:
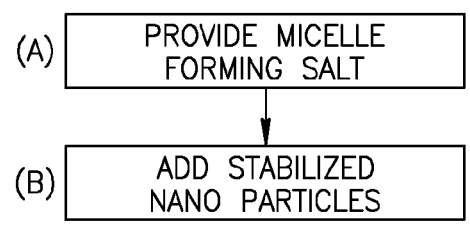

According to another embodiment of the invention, a flow chart of which is shown in FIG. 4, a charge director material is obtained by providing (in (A)) a salt of dialkyl sulfosuccinate and adding to it (B) stabilized nanoparticles of a simple salt. The stabilized nanoparticles may be, for instance, a $BaCO_3$ in basic barium pateronate (BBP)(available from Crompton and Witco).

$BaCO_3$ in BBP is known itself as a charge director, and it has now been found that a charge director comprising it together with $BaTR_2$ may have a synergistic effect, as summarized in table III below:

TABLE III

| BaTR₂ | | | BBP | | | | | | |
|---|---|---|---|---|---|---|---|---|---|
| g 5% soln | grams solids | % in ink | g 5% soln | g solids | % in ink | wt % | LFC | HFC | PC |
| 0.25 | 0.0125 | 0.1 | 0 | 0 | 0 | 100.0 | 7 | 22 | 15 |
| 0.25 | 0.0125 | 0.1 | 0.08 | 0.004 | 0.032 | 75.8 | 10 | 71.2 | 61.2 |
| 0 | 0 | 0 | 0.25 | 0.0125 | 0.1 | 0.0 | 9 | 77.3 | 68.3 |
| 0.25 | 0.0125 | 0.1 | 0.14 | 0.007 | 0.056 | 64.1 | 13 | 149.3 | 136.3 |

TABLE III-continued

| BaTR$_2$ | | | BBP | | | | | | |
|---|---|---|---|---|---|---|---|---|---|
| g 5% soln | grams solids | % in ink | g 5% soln | g solids | % in ink | wt % | LFC | HFC | PC |
| 0.05 | 0.0025 | 0.02 | 0.25 | 0.0125 | 0.1 | 16.7 | 15 | 175.8 | 160.8 |
| 0.25 | 0.0125 | 0.1 | 0.2 | 0.01 | 0.08 | 55.6 | 14 | 191.5 | 177.5333 |
| 0.1 | 0.005 | 0.04 | 0.25 | 0.0125 | 0.1 | 28.6 | 14 | 216.3 | 202.3 |
| 0.2 | 0.01 | 0.08 | 0.25 | 0.0125 | 0.1 | 44.4 | 15 | 251.9 | 236.9 |

An exemplary full protocol for obtaining such a charge director is: prepare a mixture of 2% (w/w) of toner particles in Isopar-L, add the amount of BaTR$_2$ solution followed by the amount of BBP solution. Incubate overnight at room temperature and measure conductivity values.

A charge director material BaSO$_4$@BaTR$_2$ was introduced as a charge director into ink comprising 2% (w/w) toner particles dispersed in ISOPAR. The ink was prepared as described in WO97/01111 and U.S. patent application Ser. No. 11/068,620, filed Feb. 28, 2005, the disclosures of both are incorporated herein by reference, except for the use of a charge director of the present invention. The ink was used to print in HP Indigo series II presses, models 5000, 3050, and 3000. Same procedure was also carried out with BaHPO$_4$@BaTR$_2$.

Figure 5:
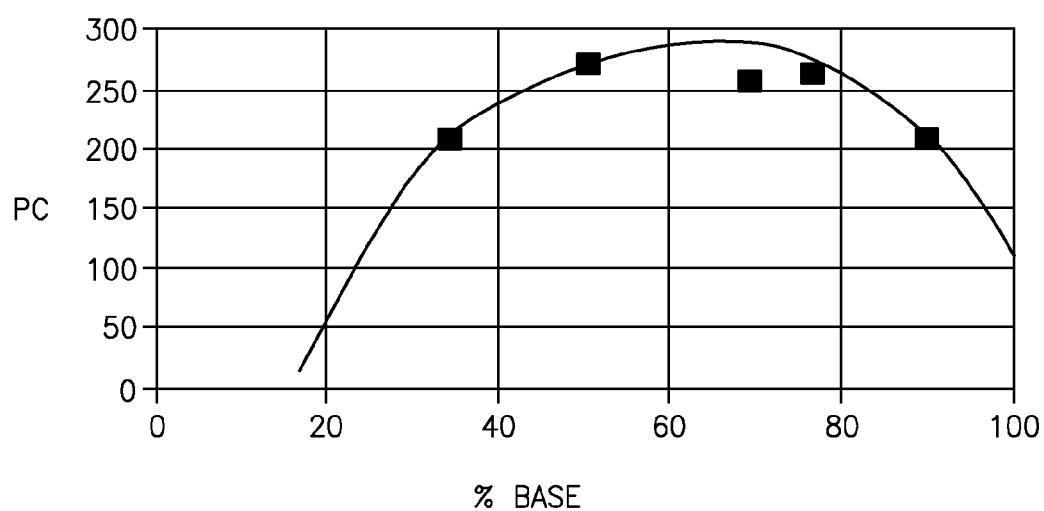
FIG. 5 is a graph showing charge particle achieved with a charge director that was prepared according the method described in FIG. 1, as function of percent acid titrated with a strong base during the charge director preparation.

FIG. 5 shows the particle charge achieved with charge directors prepared by a method according to the invention with different amounts of base. The graph shows that a high charge is achieved at 50-85% neutralization, and the highest charge is obtained when about 75% of the protons are titrated.

Figure 6:
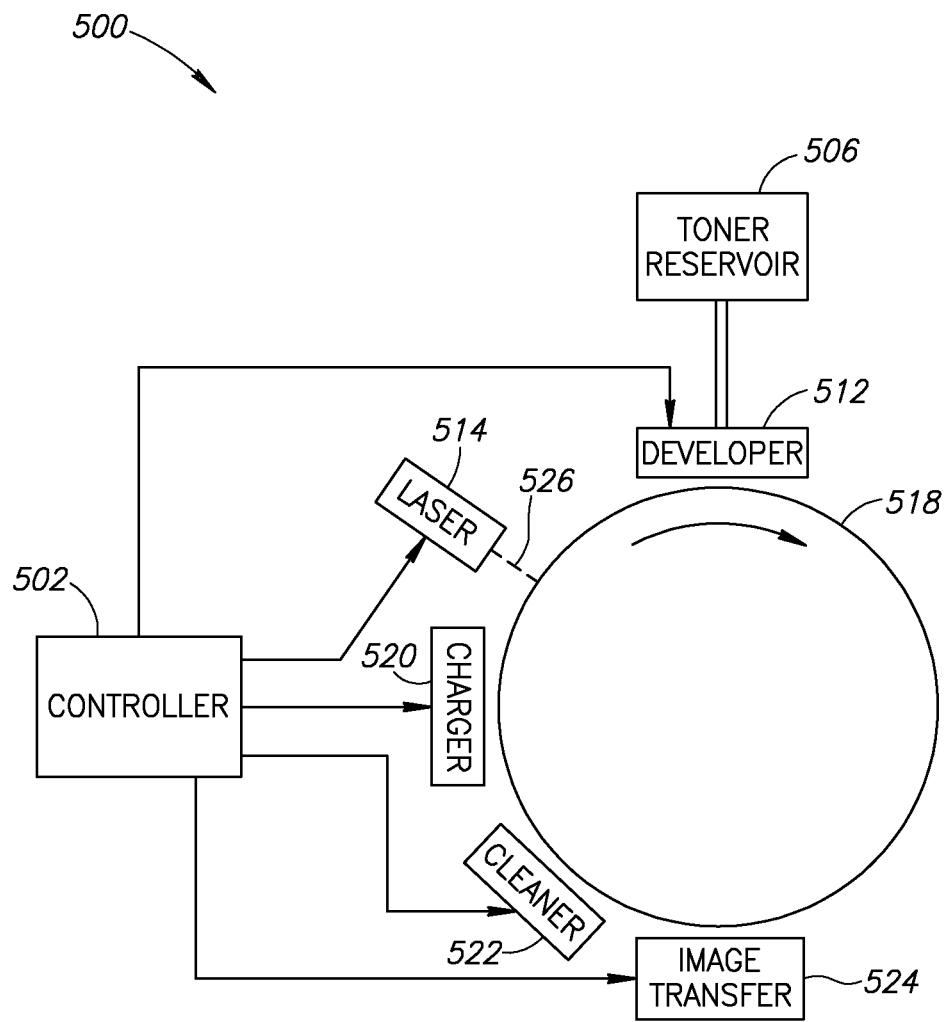
FIG. 6 is a schematic illustration of a printing machine used to print with an ink that included a charge director material according to some embodiments of the present invention.

Referring to FIG. 6, a schematic diagram is shown demonstrating the relationship of a plurality of elements of a printing apparatus 500, of the kind used to produce prints using a toner or CD of the invention. The printing apparatus 500 (which in itself is not new) shown in FIG. 6 is purely schematic to illustrate that the invention can be performed on any liquid toner printer or copier. The toner of the invention can be applied to any system, which transfers toner to a final substrate by one color separation as well as to printing apparatuses which transfer all the separations to an intermediate transfer member and then transfer the group of separations to the final substrate together. Furthermore, the exact mode of development is not important to the practice of the invention, and development can be by binary (layerwise) transfer of high concentration toner or by electrophoretic development using any of the multitude of methods known for bringing the toner into contact with a latent image.

Printing apparatus 500 comprises conventional components such as a photoreceptor imaging cylinder 518 having a photoreceptor attached or bonded to it and an axis about which the cylinder rotates and an image transfer section 524 for transferring the developed image to a substrate either directly or via an intermediate transfer member, charger 520 and a laser unit 514 that provides a scanning laser beam 526 for generating latent images on photoreceptor 518, a developer 512 for developing the latent images and optionally, a cleaning station 522 are positioned around the perimeter of photoreceptor 518.

A printing apparatus provided with the elements described with respect to FIG. 6 is useful with toner or inks comprising charge director materials described herein. A controller 502 is provided in the printing apparatus in order to issue commands to printing apparatus elements, receive data from printing apparatus elements, process printing apparatus element data, and/or to control printing apparatus operation, in an exemplary embodiment of the invention. Optionally, printing apparatus elements include writing parameter controlling elements, such as a developer 512 and/or a laser 514. Optionally, the printing apparatus includes reservoir tanks for storing printing materials, such as a toner reservoir 506.

Such a printing machine was found to be capable of printing as many as 50,000 prints without requiring any addition of charge director material or component. For comparison, when same machine prints with a standard toner, similar to that of the invention, but with a tri-component charge director including lecithin, basic barium petronate, and alkyl aryl sulfonate, charge director material is added after about each 5,000 impressions, depending on the coverage. It was also found, that when a charge director as described herein is used, single pixel size dots are formed and transfer well, contradictory to what sometimes happens when printing with the same ink with prior art charge director. Another advantage that an ink as described herein may have over prior art CD is that it does not deteriorate the photoconducting plate. The ink with the charge director material described herein also has a very low background (about 20 pS/cm, compared to between 60 and 100 pS/cm achieved with some known charge directors). This results in meaningful decrease in background ink development and improvement of sharpness of image contour.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps described with respect to one of the embodiments. Variations of embodiments described will occur to persons of the art. Furthermore, the terms "comprise," "include," "have" and their conjugates, shall mean, when used in the disclosure and/or claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents, which perform the same function, even if the structure or acts are different, as known in the art. Therefore, the scope of the invention is limited only by the elements and limitations as used in the claims.

The invention claimed is:

1. A charge director material for charging a liquid toner the charge director material comprising:
   (a) nanoparticles of a simple salt;
   (b) a first micelle forming substance, being sulfosuccinate salt of the general formula $MA_n$, wherein M is a metal, n is the valence of M, and A is an ion of the general formula (I)

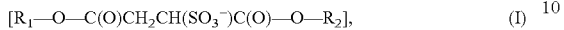
   $$[R_1\text{—}O\text{—}C(O)CH_2CH(SO_3^-)C(O)\text{—}O\text{—}R_2], \quad (I)$$

wherein each of $R_1$ and $R_2$ is an alkyl group and wherein at least one of $R_1$ and $R_2$ is $C_{13}H_{27}$; and
   (c) a second micelle forming substance.

2. A charge director material according to claim 1, wherein the second micelle forming compound is basic barium petronate.

3. A charge director material according to claim 1, which is substantially free of an acid having a general formula HA.

4. A charge director material according to claim 1, comprising micelles of said sulfosuccinate salt enclosing said nanoparticles.

5. A charge director material according to claim 1, wherein said nanoparticles are of average size between 2 nm and 200 nm.

6. A charge director material according to claim 1, wherein said simple salt is $BaSO_4$ or BaHPO4.

7. A method for obtaining the charge director material of claim 1,
   the method comprising:
   (a) providing a sulfosuccinate salt of the general formula $M'A_{n'}$, M' being a metal other than the metal M and n' being the valence of M',
   (b) adding strong acid as to obtain an acid HA; and
   (c) adding a strong base as to neutralize 30-85%.

8. A method according to claim 7, wherein the strong base is added to neutralize 50-80% of acids.

9. A method according to claim 7, further comprising:
   (d) evaporating solvents to obtain the material in solid form, and performing an aqueous workup on the solid obtained, or
   (d) filtering to obtain solid product, and performing an aqueous workup on the solid obtained.

10. A method according to claim 7, wherein said strong acid has at least one proton with a $pK_a$ smaller than 1.

11. A charge director material according to claim 1, wherein each of $R_1$ and $R_2$ is $C_{13}H_{27}$.

12. A method according to claim 7, wherein each of $R_1$ and $R_2$ is $C_{13}H_{27}$.

* * * * *